United States Patent
Czyszczewski et al.

(10) Patent No.: US 6,624,909 B1
(45) Date of Patent: Sep. 23, 2003

(54) IMAGE FILE FORMAT FOR STORING GRAPHICAL MATTER AND RELATED INFORMATION

(75) Inventors: Joseph Stanley Czyszczewski, Longmont, CO (US); Nenad Rijavec, Longmont, CO (US); James Thomas Smith, Boulder, CO (US); Mikel John Stanich, Longmont, CO (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/323,163

(22) Filed: May 27, 1999

(51) Int. Cl.⁷ .............................................. G06F 15/00
(52) U.S. Cl. ................... 358/1.17; 358/1.16; 358/1.15; 358/296; 358/451; 382/298
(58) Field of Search ................................ 358/1.17, 1.16, 358/1.15, 451, 428, 296; 382/298

(56) References Cited

U.S. PATENT DOCUMENTS

| | | | |
|---|---|---|---|
| 4,403,257 A | 9/1983 | Hsieh | 358/460 |
| 4,504,972 A | 3/1985 | Scherl et al. | 382/172 |
| 4,668,995 A | 5/1987 | Chen et al. | 382/272 |
| 4,914,524 A | 4/1990 | Kimura | 358/462 |
| 5,065,437 A | 11/1991 | Bloomberg | 382/176 |
| 5,159,471 A | 10/1992 | Satou et al. | 358/466 |
| 5,202,933 A * | 4/1993 | Bloomberg | 382/176 |
| 5,225,911 A | 7/1993 | Buckley et al. | 358/296 |
| 5,278,920 A | 1/1994 | Bernzott et al. | 382/176 |
| 5,313,309 A | 5/1994 | Tai et al. | 358/455 |
| 5,341,224 A | 8/1994 | Eschbach | 358/456 |
| 5,568,571 A | 10/1996 | Willis et al. | 382/254 |
| 5,617,485 A | 4/1997 | Ohuchi et al. | 382/176 |
| 5,640,465 A | 6/1997 | Smitt | 382/172 |
| 5,742,703 A | 4/1998 | Lin et al. | 382/176 |
| 5,754,684 A | 5/1998 | Kim | 382/176 |

OTHER PUBLICATIONS

Adobe Developers Association, TIFF™ Revision 6.0, Jun. 3, 1992, pp. 2–43.

* cited by examiner

Primary Examiner—Mark Wallerson
Assistant Examiner—Twyler Lamb
(74) Attorney, Agent, or Firm—David W. Victor; Konrad Raynes Victor & Mann LLP (57) ABSTRACT

Provided are a method, system, and program for processing graphics input. The graphics input may include a first and second types of graphics matter, such as line art and continuous tone. At least two data structures including representations of a same graphics matter are provided. An object is generated to include information on the data structures, including information relating the data structures. The object is then processed to produce graphics output including the graphics matter in the graphics input.

49 Claims, 5 Drawing Sheets

IMAGE FILE FORMAT FOR STORING GRAPHICAL MATTER AND RELATED INFORMATION

BACKGROUND OF THE INVENTION

1. Field of the Invention

The present invention relates to an image file format for storing graphical matter and related information for use in producing graphics output, such as print output.

2. Description of the Related Art

In publishing, the pages of a document are scanned, transformed into a printer readable format, and then printed and/or archived in a computer storage device for subsequent retrieval and printing. Publishing software is used by publishing companies to electronically print and archive books. Pages of a document are scanned to produce an electronic bit-map representation of the pixels on the scanned page and the pixel color values. The page may contain line art, e.g., text and lines, and/or continuous tone, e.g., images. For black and white images, the scanned image is stored as a grey scale image wherein each pixel represented on the bit map has a corresponding shade of grey value. Optical scanners typically allow for anywhere from 16 to 256 shades of grey for each pixel. A bit map of a page that allows for grey scale values requires 4 to 8 bits for each pixel to indicate the different shades of grey. A bit map representing text only, where the pixel is either black, i.e., "on," or white, i.e., "off," only requires 1 bit per pixel to indicate either "on" or "off," black or white. A bit map that represents a color page, including line art and continuous tone, requires even more space than black and white images. Each pixel of a scanned color image can be one of 16.7 million colors, which requires 24 bits for each pixel.

After the page is scanned, the bit map produced by the scanner must be further processed into a bit map format that the printer can process. The transformation of the scanned bit map into a printer readable format is referred to as halftoning or raster image processing (RIP). In a publishing environment, halftoning or transforming, i.e., RIPping, numerous bit maps that represent the pages of a large document, such as a book, can take several hours. The result of the halftone transformation is a bi-level image, where each bit map value indicates either black or white. The halftoning transformation would use dithering to produce a wide level of shades of grey or colors. Dithering refers to the illusion of printing colors or shades of grey by varying the patterns of dots. Thus, a bit map where each bit map value can correspond to one of many values indicating different shades of grey or colors is converted to a bi-level bit map where each value indicates one of two colors—black or white. However, the halftoning or transformation process uses dithering to simulate the shades of grey or different colors. The term "gray scale" as used herein refers to a bit map where each bit map value can be one of numerous values, indicating different colors or shades of grey. The term "halftone" as used herein will refer to the transformed grey scale bit map to a bit map that can be processed by the printer. A halftone bitmap may be a bi-level bit map where there is only one value for each pixel, i.e., 0 or 1. Contone printers print a limited number of shades of a color or grey. Thus, a halftone bit map for a contone printer may include a limited number of values for each bit map value and also use dithering to simulate additional shades of grey and color. The term "halftoning" as used herein refers to the transform process of transforming a gray scale bit map to a printer readable format, such as a bi-level bit map or contone bit map capable of a limited number of different values for each pixel that are available on the printer. Halftone bit maps are typically specific to a particular printer, i.e., device dependent.

The gray scale or halftoned bit map of each page in the book may be stored in one or more files. For instance, the tagged image file format (TIFF™)** stores one bit map for each page in a single file. A TIFF file can store both the gray scale bit map and a halftoned bitmap.

The gray scale bit map is referred to as device independent because it represents the image without reference to a specific device. The halftone bit map is device dependent as the gray scale bit map was transformed to halftone bit map that is particularly suited to the dithering capabilities of the printer on which the halftone bit map will be printed.

Some publishers will archive the halftone bit maps of every page in a book. This method uses less space than storing the gray scale bit maps for each page and does not require subsequent transformation processes, e.g., RIPping or halftoning, when the archive file is later retrieved to reprint the book or document. However, the halftone bit map is device specific and reproductions of any images from the halftone bit map on printers different from the printer for which the transform was made will be poor quality. Further, reprinting the halftone image on the same printer at different times may produce low quality. To produce high quality images, some publishers may maintain a record of all pages in the book or document that contain continuous tone images. Using this record, the publisher will then re-scan those pages including continuous tone images and then RIP or halftone the rescanned pages for printing. This process requires substantial manual labor to access and re-scan the pages including continuous tone in the book or document.

An alternative method used today in publishing is to archive the gray scale bitmaps for each page in the book or document. This method provides a device independent bit map which may be utilized on different printers. Nevertheless, this method is problematic for at least two reasons. First, this process is very costly in processor cycles as the gray scale bit map for each page must be transformed into the halftone bit map. Performing numerous of these transforms will substantially degrade printer performance. Second, is that gray scale bitmaps require substantially more, storage space than a halftoned or bi-level bitmap. For instance, a page represented as a gray scale bit map can consume 32 megabytes (Mb) of storage, whereas a page represented as a halftoned or bi-level bit map only requires 4 Mb of storage. Moreover, compression algorithms on gray scaled pages that include both text and continuous tone image do not perform well. A lossless or LZW algorithm will substantially compress the text but only minimally compress the continuous tone image. Compression algorithms that are effective at compressing text, such as lossy and JPEG, will degrade the quality of the text component of the bit map. The printed text will be blurred at the edges as a result of such image oriented compression algorithms.

There is thus a need in the art for an improved method of archiving bit mapped representations of documents including both line art and continuous tone images.

SUMMARY OF THE PREFERRED EMBODIMENTS.

To overcome the limitations in the prior art described above, preferred embodiments disclose a system, method, program, and data structure for processing graphics input.

The graphics input may include a first and second types of graphics matter. At least two data structures including representations of a same graphics matter are provided. An object is generated to include information on the data structures, including information relating the data structures. The object is then processed to produce graphics output including the graphics matter in the graphics input.

In further embodiments, the graphics input includes the first and second types of graphics matter. In such case, the data structures may be provided by transforming a data structure in a first format representing the graphics input to a data structure in a second format representing the graphics, input. A determination is then made as to the second type of graphics matter in the graphics input. At least one data structure in the first format representing the determined second type of graphics matter is generated. In such case, the information in the generated object comprises information on the transformed data structure in the second format and each generated data structure in the first format. The information further relates each generated data structure with the transformed data structure. The related generated and transformed data structures each include representations of a same graphics matter of the second type.

The first format may be a device independent data structure and the second format is a device dependent format. For instance, the first format may be a gray scale bit map having values indicating either colors or shades of grey and the second format may be a bi-level bit map.

In further embodiments, the object may comprise a TIFF file and the information on the transformed data structure and generated data structure are maintained in image file directories (IFDs).

Preferred embodiments provide an image file format in which both device dependent data, such as the halftone of a page, and device independent data, such as the gray scale of the continuous tone images in a page, are maintained. This allows the image file format to provide sufficient information to generate high or low quality output for a print job and at the same time minimize use of storage and processor resources. If the user wants to print a proof at a low quality, then the device dependent data, i.e., already transformed bit map, will be used to generate print output. This will maximize printing performance and minimize use of processor cycles. However, if a high quality print job is desired, then those parts of the print job, such as the images, will be generated by transforming the device independent data also maintained in the image file format. Although this requires further processing time and reduces printing performance, processing time is minimized because only those portions of the print job having continuous tone are generated from the device independent data. For those pages including only text or line art, the device dependent data is sent to the printer without having to perform the costly transformation processes. The device dependent data is usually sufficient to produce high quality output for line art or text. Thus, use of processor cycles to transform device independent data, such as gray scales, is minimized by transforming only those portions of the print job that need to be transformed or halftoned again to produce high quality print output. This in turn minimizes degradation of printer performance while maintaining enough printer image information to produce high quality output.

Preferred embodiments further conserve storage resources. Typically, the device dependent bit maps use significantly less storage space than device independent bit maps. With the preferred file format, device independent bit maps are only maintained for those parts of the print job that need to be transformed at printing time to produce high quality. This insures that high quality can be maintained and minimizes storage resources because device independent data is only maintained for those parts of the print job that require transformation or halftoning of the device independent data in order to produce the desired high quality.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several embodiments of the present invention. It is understood that other embodiments may be utilized and structural and operational changes may be made without departing from the scope of the present invention.

Hardware and Software Environment

Figure 1:
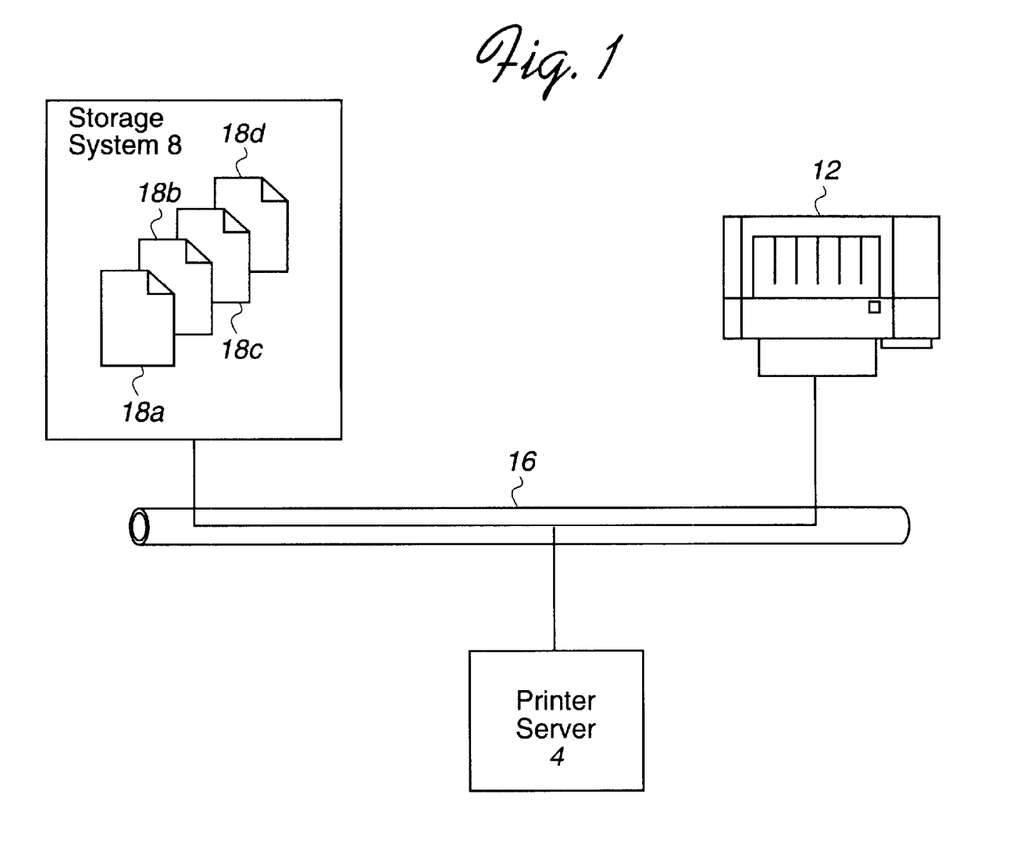
FIG. 1 is a block diagram illustrating a computing environment in which preferred embodiments of the present invention are implemented.

FIG. 1 illustrates a printing environment 2 in which preferred embodiments are implemented. A printer server 4, storage system 8, and printer 12 are all interconnected via a network 16. The storage system 8 includes one or more image files 18a, b, c, d, such as TIFF files, that store gray scale and/or halftoned bit maps or pages to print. The printer server 4 is capable of accessing the image files 18a, b, c, d and performing any user selected processing on such files, such as RIPping or halftoning a gray scale bit map or touch-up halftoning operations on a halftone bit map. Alternatively, if the image file 18a, b, c, d includes a transformed image, e.g., a halftone or RIPped bit map, then the printer server 4 may just transfer the transformed bit maps in the image file 18a, b, c, d to the printer 12 for printing.

The printer server 4 may be a separate stand alone server including an operating system such as AIX®, OS/390™, UNIX®, OS/2®, MVS™, WINDOWS®, etc. For instance, the printer server 4 may be implemented 4 on the IBM RS/6000® server and include the AIX operating system and the IBM INFOPRINT™ Manager software. The storage system 8 may be any suitable non-volatile storage device, such as a hard disk drive, a direct access storage device (DASD), which is comprised of interconnected hard disk drives, a tape storage device, automated tape library (ATL), optical disk library, holographic units, etc.

The printer 12 may be any suitable printer machine known in the art, including printers capable of handling large scale publishing jobs, such as printing an entire book. The network 16 may be comprised of any suitable network architecture known in the art, such as LAN, Ethernet, WAN, System Area Network (SAN), Token Ring, LocalTalk, TCP/IP, the Internet, etc. Alternatively, there may be separate and different networks between the printer server 4, storage system 8, and printer 12.

In further embodiments, the storage system 8 and printer server 4 may be housed within a single computer device. Further, transformation and other operations described as performed within the printer server 4 may be performed within the printer 12, and vice-versa.

The publishing software in which the preferred embodiment programs for generating and processing the image file format of the preferred embodiments may be installed on any computer or device that is involved in processing, i.e., generating, reading, and printing, the image file format of the preferred embodiments, such as the scanner which scans the document and generates the images, the printer 12, printer server 4, client station, etc. In certain embodiments, the software to process the preferred embodiment image file format may be included in the IBM InfoPrint Manager software.

The TIFF File Embodiment

Figure 2:
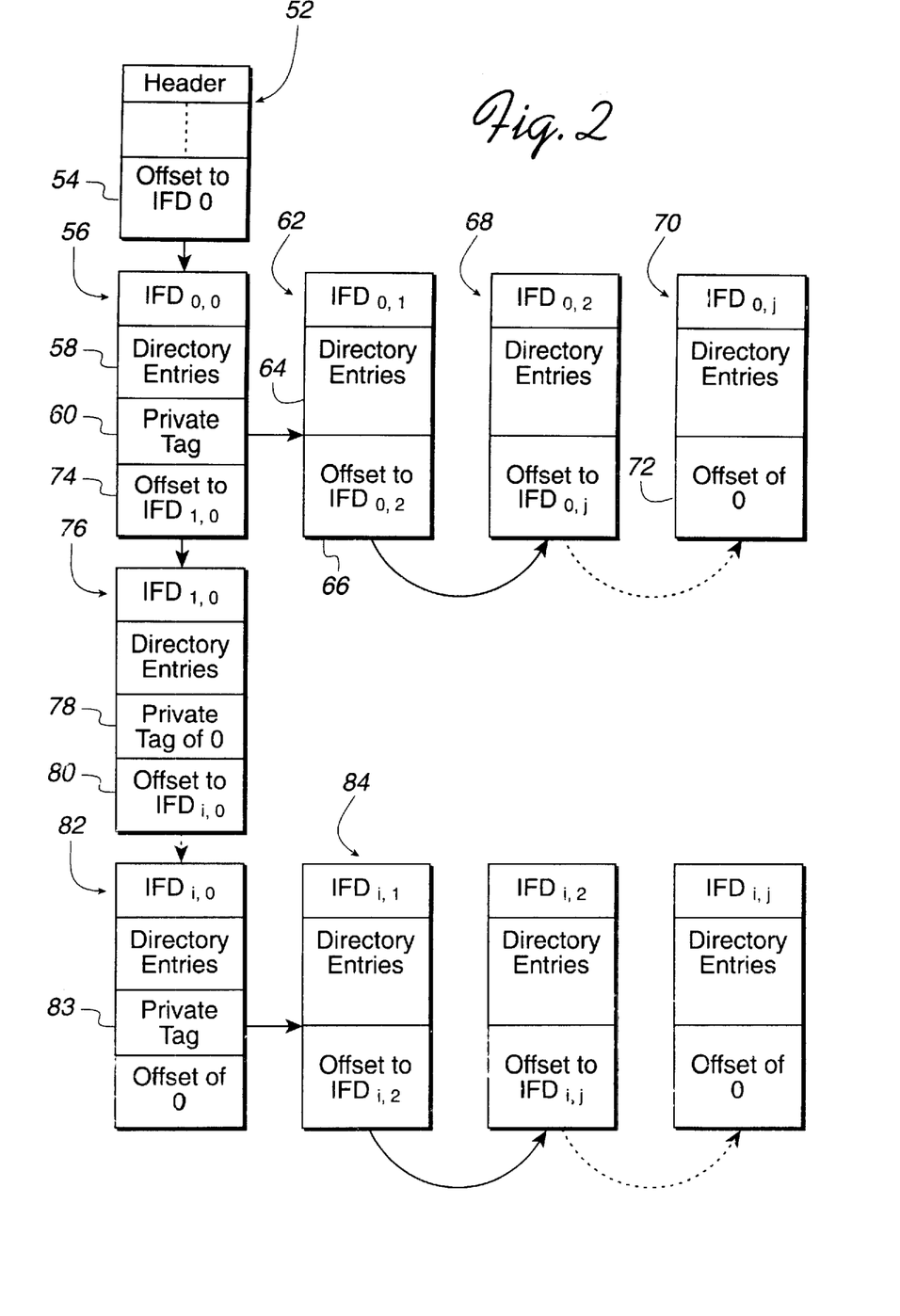
FIG. 2 illustrates image file format-data structures in accordance with preferred embodiments of the present invention.

Preferred embodiments include an image file format for storing bit maps representations of line art and continuous tone on one or more pages. FIG. 2 illustrates a TIFF image file 50 format used to store halftone and/or gray scale bit maps in accordance with preferred embodiments. A TIFF files contains one or more image file directories (IFD) that include: information on a bit map representing a page in a document. In current art, a TIFF file maintains an IFD for each bit map representation of a page, either halftoned or gray scale, in a document included in the TIFF. A TIFF file may include a bit map for one or more pages from a document. Details of the TIFF format are described in the publication "TIFF, Revision 6,"(Copyright Adobe Systems, Inc., 1986–88, 1992), which publication is incorporated herein by reference in its entirety.

In preferred embodiments, the TIFF file 50 may maintain multiple bit maps for each page in a document. For instance, $IFD_{i,0}$ may maintain information on a halftone bit map in the TIFF file of page i, where the halftone may include both line art and/or continuous tone. The TIFF file 50 may further include one or more gray scale bit maps for the images in page i, wherein $IFD_{i,1}$ would include information on a gray scale bit map of an image in page i. Information on j additional gray scale bit maps in the TIFF file 50 for the images on page i may be maintained in $IFD_{i,2}$ to $IFD_{0,j}$. In this way, TIFF files in accordance with preferred embodiments maintain a halftone and IFD for each page, including a halftone of both line art and any continuous tone images, and additional associated IFDs and gray scale bit maps for the images within the page.

FIG. 2 illustrates how IFDs, text, and images are maintained in a TIFF file 50 in accordance with the preferred embodiments. In FIG. 2, the TIFF file 50 maintains bit maps for i pages. An image file header 52 includes a pointer or offset 54 to the first $IFD_{0,0}$ 56, including directory entries 58 on the location of a halftone of the contents, i.e., line art and/or continuous tone, of the first page in the TIFF file 50. The IFDs of the preferred embodiments include a private tag 60 which indicates whether any gray scale bit maps are maintained for the first page and a pointer to the $IFD_{0,1}$ for the first gray scale bit map for page 1. As discussed, one or more gray scale bit maps may be provided for each page if the page contains one or more images. A private tag indicates information allocated in a private number range that is registered with a TIFF administrator and is meaningful to the particular organization defining the private tags. In preferred embodiments, the private tag is used to indicate IFDs for one or more gray scale bit maps for a particular page, and a pointer to the IFD for the gray scale bit map.

In FIG. 2, the private tag 60 in the first $IFD_{0,0}$ points to $IFD_{0,1}$ 62, which includes directory entry 64 information on a first gray scale bit map of a continuous tone image within the first page. If there are additional gray scale bit maps maintained for the first page, then $IFD_{0,1}$ 62 would include, as shown in FIG. 2, an offset 66 to $IFD_{0,2}$ 68 including information on a second gray scale bit map of a continuous tone section of page 1. Additional IFDs may be maintained for any additional gray scale images maintained for page 1. The final jth $IFD_{0,j}$ 70 would include a value of zero for the offset 72, indicating that there are no further gray scale images maintained for page 1. The base $IFD_{0,0}$ for the first page includes offset information 74 indicating the location of the next base $IFD_{1,0}$ 76 for the halftone of the second page. In the example of FIG. 2, there are no gray scale bit maps maintained for page 2, as indicated by the private tag 78 value of zero. Thus, page 2 may not include any continuous tone images and just consist of text. The halftone. $IFD_{1,0}$ for the second page maintained in-the TIFF file 50, and any subsequent $IFD_{i,0}$ for pages before the last page, would include an offset 80 indicating the location of the base IFD for the next page. FIG. 2 illustrates that the $IFD_{i,0}$ 82 for the last page i maintained in the TIFF file 50 includes a private tag 83 pointing to a chain of IFDs beginning at $IFD_{i,1}$ 84, which maintain information on gray scale bit maps in the TIFF file 52 for the images in the last page i. Each IFD further includes orientation information indicating the positioning within the page of the image represented by the bit map associated with the IFD.

With preferred embodiments, a TIFF file may maintain, for each page, a halftone image of the entire contents of a page, including line art and continuous tone, and gray scale bit maps for each image within a page. This allows a single TIFF to maintain device dependent information, i.e., the halftone bit map, and device independent information, the gray scale bit maps, for each page. Such TIFF files may be archived pages of a book or larger document maintained in the storage system 8.

Figure 3:
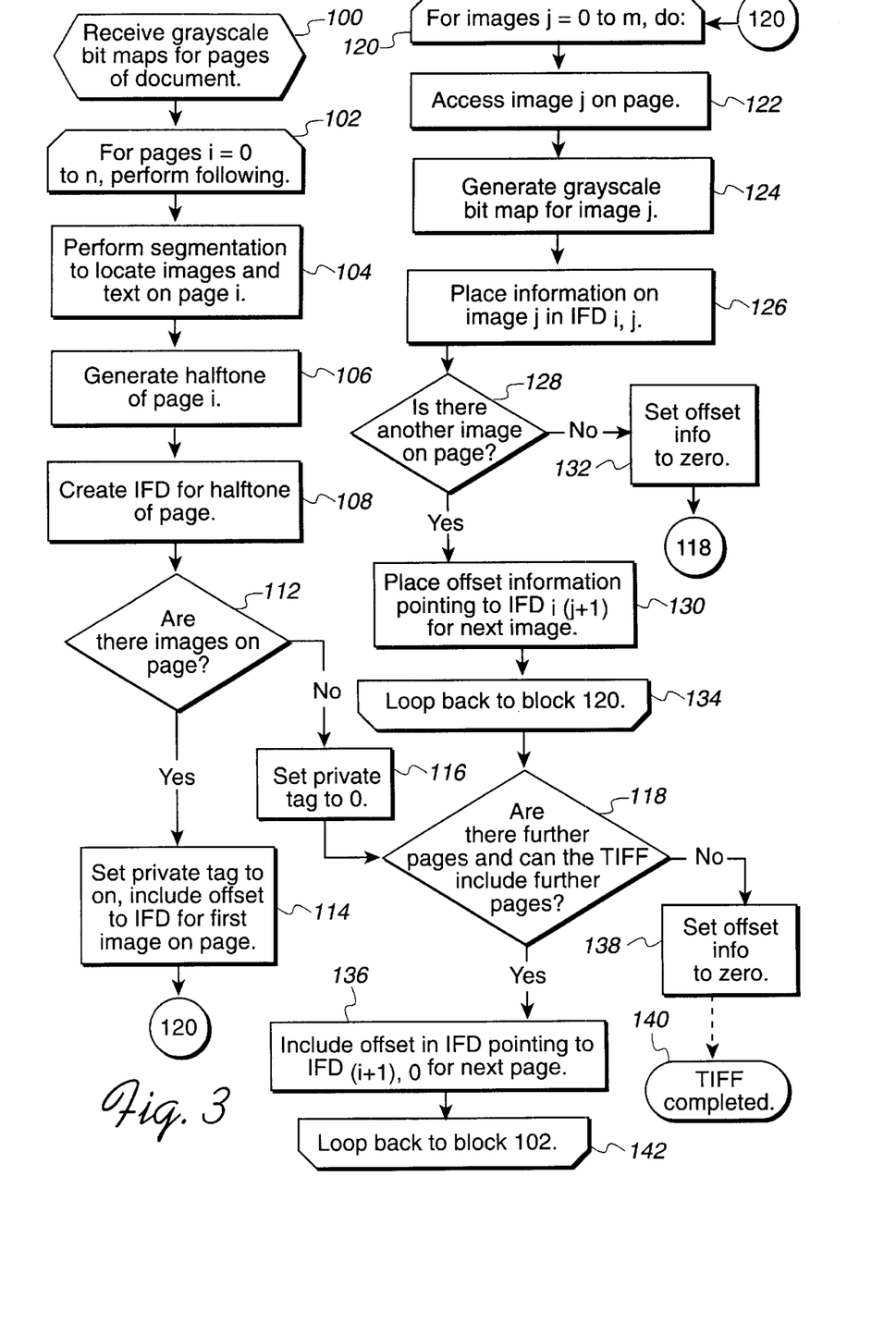
FIG. 3 illustrates logic to generate an image file in accordance with preferred embodiments of the present invention.

FIG. 3 illustrates logic implemented in a publishing program to generate TIFF files for a multi-page document such as a book from scanned images of the pages of the document. The pages may include line art and/or continuous tone images. The scanning process produces a gray scale bit map representation of the page. The process begins at block 100 where the publishing software receives gray scale bit maps for each page in a document. The publishing software in setting up the TIFF file would create a header including a pointer to the first IFD. The publishing software begins a loop (at block 102) that iterates for each page of the document to include in a TIFF file. If the number of pages that may be included in a single TIFF file is less than the number of pages in the document, then the document would be stored throughout multiple TIFF files. The loop at block 102 iterates for each page i to include in the TIFF file, where i is a value from 0 to n. The publishing software performs segmentation (at block 104) of page i to locate the images and text therein. The publishing software generates (at block 106) a halftone bit map of the entire page i, including any text and/or continuous tone images therein. The publishing software then creates (at block 108) $IFD_{i,0}$ to include information on the halftone of the entire page i and its location in the TIFF file. If there are images on the page (at block 112), then the publishing software sets (at block 114) the private tag in $IFD_{i,0}$ to include an offset to $IFD_{i,1}$ for the first image on page i. If there are no images on page i, then the private tag in $IFD_{i,0}$ is set (at block 116) to zero.

If there are images in page i, then from block 114, the publishing software proceeds to perform the loop beginning at block 120 for each image j in page i, where extends from 0 to m. The publishing software accesses (at block 122) image j on page i and the generates (at block 124) a gray scale bit map for the segmented image j from the gray scale i image received from the scanner. The publishing software then places (at block 126) information on image j in $IFD_{i,j}$ including the location of the gray scale bit map for image j in the TIFF file and orientation information on where to orient image j within page i. If there is another image on page i (at block 128), then the publishing software places (at block 130) offset information in $IFD_{i,j+1}$ for the next image (j+1) and then proceeds back to block 120 to perform another iteration of the loop. If there are no further images, then the publishing software sets (at block 132) the offset information in $IFD_{i,j}$ to zero. From block 132, control proceeds to block 118 to process any further pages to include in the TIFF file.

After generating IFDs for each image j in page i, the publishing software determines (at block 118) whether there are any further pages in the document and, if so, whether the TIFF file can accommodate further pages. If both conditions are satisfied, then the publishing software includes (at block 136) offset information in $IFD_{i,0}$ pointing to the IFD for the halftone of the next page (i+1) and then proceeds (at block 142) to perform another iteration of the loop at block 102. If there are no further pages or the TIFF file cannot accommodate further pages, then the publishing software sets the offset information in $IFD_{i,0}$ to zero and completes generating the current TIFF file. If there are further pages in the document for which gray scale bit maps were generated from the scanner, then the publishing software would begin another instance of the logic beginning at block 100 to create another TIFF to include image information for further pages in the document.

In this way, a TIFF file includes for one or more pages of a document a halftone bit map of the entire page, including any line art and/or continuous tone, and gray scale bit maps for each image on a page. In further embodiments, there may be multiple gray scale bit maps for a single continuous tone image on the page, in which case the image information for each gray scale bit map is merged into the halftone of the image to produce a single halftone bit map of the image.

Figure 4A:
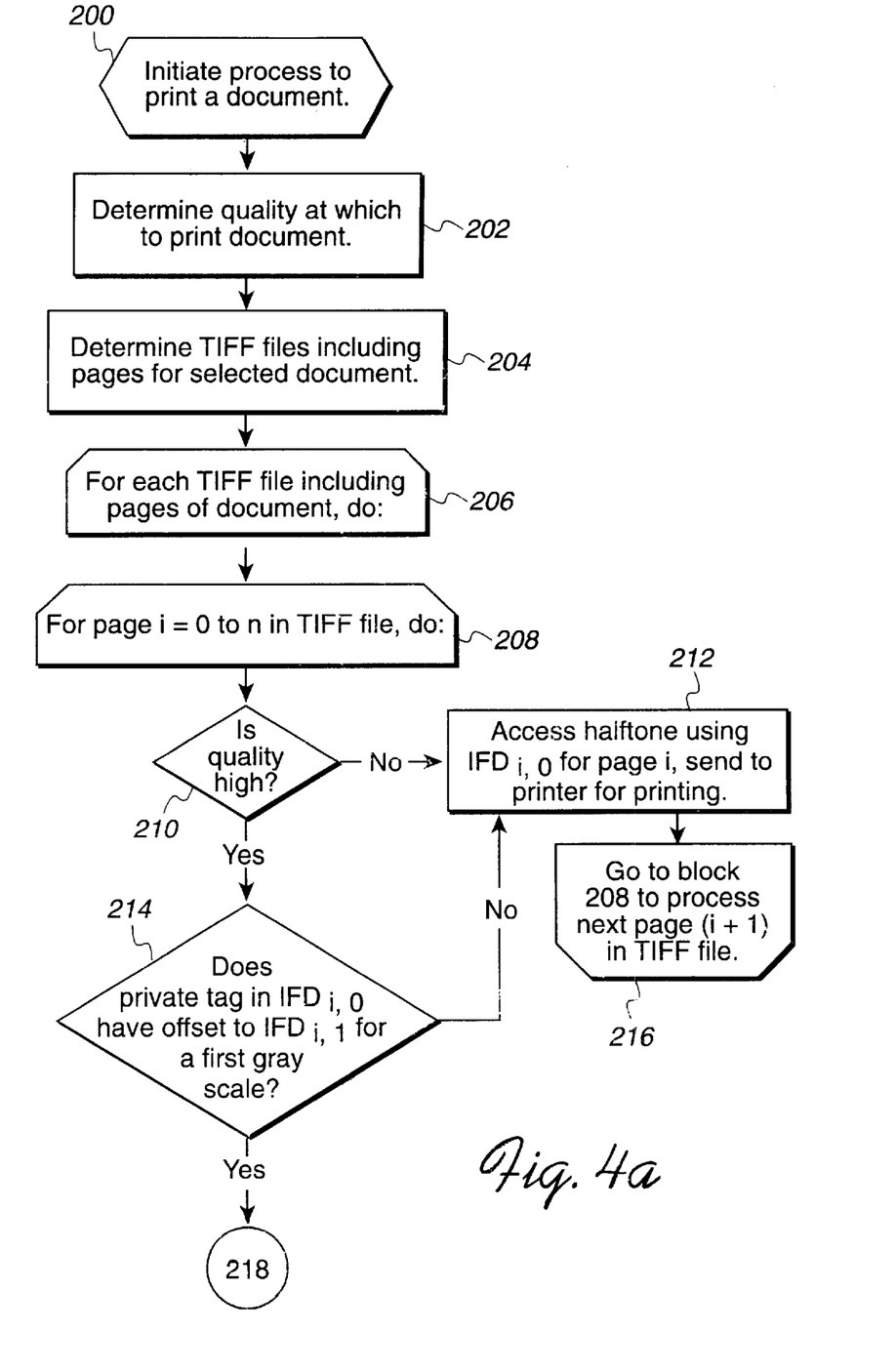
FIGS. 4a, b illustrate logic to process an image file to print a document in accordance with preferred embodiments of the present invention.
Figure 4B:
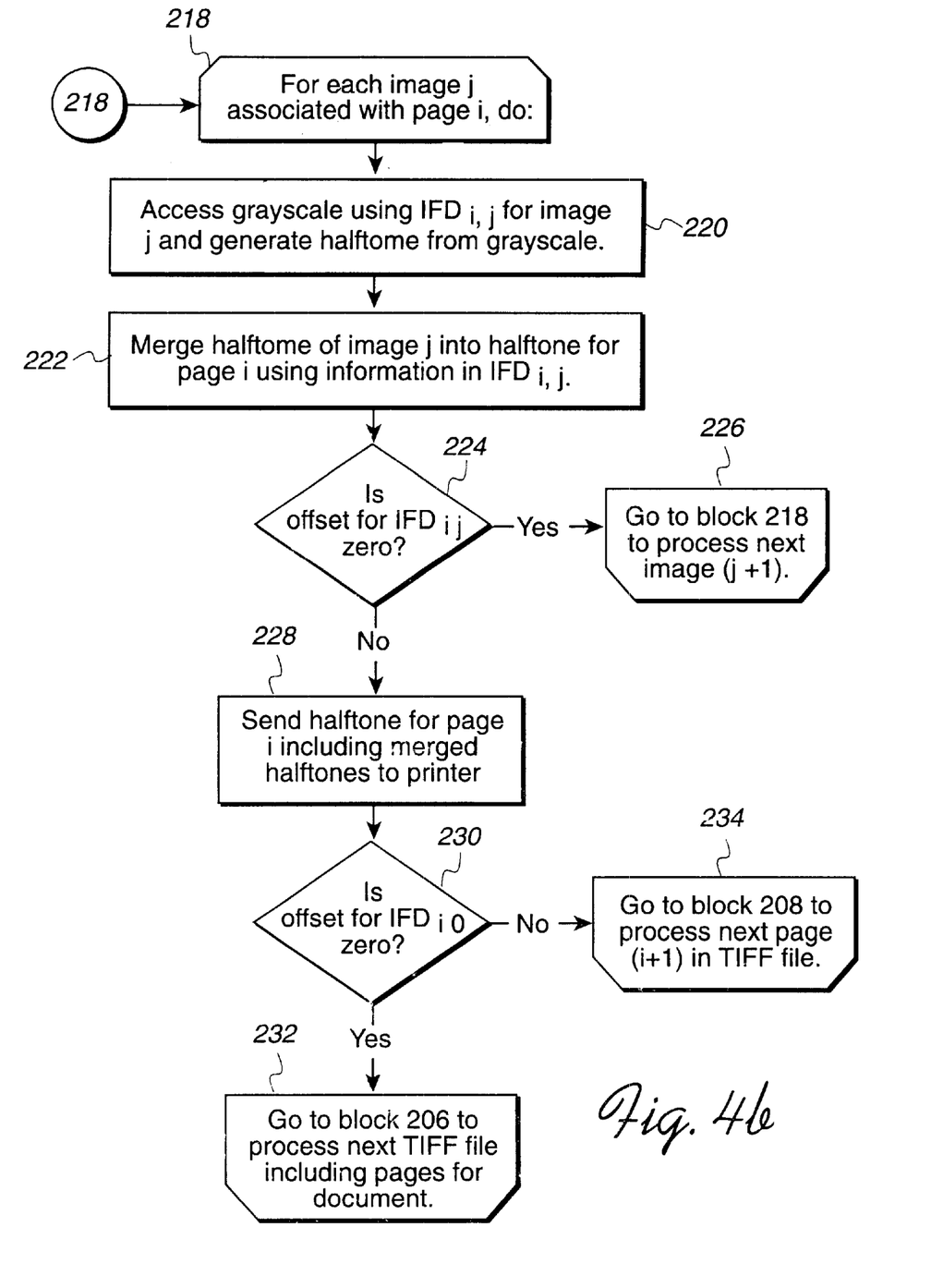

FIGS. 4a, b illustrate logic implemented within the publishing software to process a request to access and print the content of a TIFF file in accordance with preferred embodiments. The printing process to print a document archived in the storage system 8 in one or more TIFF files 18a, b, c, d begins at block 200 in FIG. 4a. This process may be, initiated by a user at a client station, printer 12 or the printer server 4 using a graphical user interface to select the document to print. In such graphical user interface, the user may select a print quality for the print job, such as high or low. The low quality may be used to proof the job to observe the general layout of the printed document. High quality is used for the final print job. The publishing software determines (at block 202) the quality the user selected, i.e., high or low. The publishing software then determines (at block 204) the TIFF files including pages for the selected document. As discussed halftone and gray scale bit maps representing pages in a document may be archived in multiple TIFF files 18a, b, c, d.

The publishing software then proceeds to begin a loop (at block 206) for each TIFF file 18a, b, c, d including pages of the selected document. After selecting a TIFF file, the publishing software begins a loop (at block 208) to generate halftone images of the n pages in the selected TIFF file. For a selected page i (at block 210), if the user did not select a high print quality, then the publishing software access (at block 212) the halftone bit map described in $IFD_{i,0}$ and sends the halftone bit map to the printer for printing. Thus, the halftone bit map is used to print the page i, regardless of whether page i includes both text and image(s), i.e., continuous tone. From block 212, the printer server proceeds to block 216 to process any further pages (i+1) in the TIFF file by performing another iteration of the loop beginning at block 208. If the print quality is high, then the publishing software determines (at block 214) whether the private tag for $IFD_{i,0}$ has an offset pointing to one or more IFDs providing information on gray scale bit maps associated with page i. If no, then the publishing software sends (at block 214) the halftone bit map indicated in $IFD_{i,0}$ to the printer 12 for printing. In this case, the page i does not include any continuous tone, and the halftone bit map can produce high quality line art, such as text.

If the private tag points to a chain of one or more. IFDs beginning at $IFD_{i,1}$, then the publishing software begins a loop (at block 218, in FIG. 4b) for each image j associated with page i. As part of this loop, at block 218, the publishing software accesses (at block 200) the gray scale for image j using $IFD_{i,j}$ and generates a halftone bit map by transforming, e.g., RIPping, the gray scale bit map for image j. The publishing software then merges (at block 222) the halftone bit map generated for image j into the halftone for page i, described in $IFD_{i,0}$. The publishing software would use the orientation information maintained in the $IFD_{i,j}$ for image j to merge the halftone bit map of the image j into the correct location in page i. After merging the halftone for image j into the halftone for page i, the publishing software determines (at block 224) whether the offset for $IFD_{i,j}$ indicates a further image (+1) for the current page i. If so, the publishing software proceeds (at block 226) to perform another iteration of the loop beginning at block 218 to halftone the next image (j+1) and merge such halftone into the current halftone for page i. Thus, the halftone for a page i may have multiple levels of halftone bit maps merged therein. If there are not further images for the page i to merge into the halftone for page i, then the publishing software sends (at block 228) the generated halftone bit map for page i, which may include multiple levels of merged halftones, to the printer 12 for printing. The publishing software then determines (at block 230) whether the offset for $IFD_{i,0}$ is zero, indicating that the TIFF does not include any further pages i to process. If so, then the publishing software (at block 232) proceeds back to block 206 to process any further TIFF files including pages for the selected document. Otherwise, the publishing software proceeds (at block 234) back to block 208 to generate the halftone bit map for the next page (i+1) in the selected document.

Preferred embodiments thus provide a TIFF file format in which both device dependent data, such as the halftone of a page, and device independent data, such as the gray scale of the continuous tone images in a page, are maintained. If the user wants to print at a low quality or proof of the document, then the publishing software will transmit the already transformed halftone bit map representations of the pages, including line art and/or continuous tome, to the printer 12 for printing. This process will maximize printing performance and minimize use of processor cycles as the publishing software does not have to transform, e.g., halftone or RIP, any gray scale bit maps. However, if a high quality print job is selected, then the publishing software will use the device independent data and transform the gray scale bit maps to halftones and merge the regenerated halftone bit maps into the halftone of the page to provide high quality continuous tones within the page. With the preferred embodiments, publishers do not have to manually rescan pages in the document including continuous tone as the device independent gray scale bit map of the images is maintained in the TIFF file format of the preferred embodiments. Instead, the printing program automatically generates halftones from the gray scales. Although this requires further processing time and reduces printing performance, processing time is minimized because only those pages having continuous tone are automatically transformed. For those pages including only text or line art, the saved halftone is sent to the printer without having to perform the costly transformation processes. A halftone of line art or text alone usually can print at high quality on any printer. Thus, use of processor cycles to transform gray scales is minimized by halftoning only those pages that need to be halftoned again to insure the selected high quality of print output. This in turn minimizes degradation of printer performance while maintaining enough printer image information to produce high quality output.

The TIFF file format of the preferred embodiments allows users to print pages that do not include continuous tone or a low quality version of the document with minimum use of processing time because the device dependent halftoned or RIPped image may be sent directly from the TIFF file to the printer 12 for printing. Moreover, the device independent data in the preferred TIFF file format can be used to automatically print high quality images from the gray scale bit maps maintained for the continuous tone images in a page.

Further, in preferred embodiments, different compression techniques may be used for different components in the TIFF file, depending on whether the IDF indicates the component to be a halftone or gray scale bit map. The gray scale bit maps in a TIFF file may be compressed using compression algorithms particularly suited for compressing continuous tone, such as JPEG or Lossy. The halftone images in the TIFF file may be compressed using LZW or another Lossless algorithm. This insures that compression for both the halftone and gray scale components are maximized, thereby minimizing the storage space needed to archive the pages. The preferred embodiment TIFF file further minimizes use of storage space because gray scales are only maintained for those pages that include continuous tone images; gray scales are not maintained for pages that only include text or line art. This minimizes the number of gray scale bit maps archived, and hence minimizes storage space as gray scale bit maps require substantially more storage space than halftoned bi-level bit maps.

Alternative Embodiments/Conclusion

This concludes the description of the preferred embodiments of the invention. The following describes some alternative embodiments for accomplishing the present invention.

The preferred embodiments may be implemented as a method, apparatus or article of manufacture using standard programming and/or engineering techniques to produce software, firmware, hardware, or any combination thereof. The term "article of manufacture" (or alternatively, "computer program product") as used herein is intended to encompass one or more computer programs and data files accessible from one or more computer-readable devices, carriers, or media, such as a magnetic storage media, "floppy disk," CD-ROM, a file server providing access to the programs via a network transmission line, holographic unit, etc. Of course, those skilled in the art will recognize that many modifications may be made to this configuration without departing from the scope of the present invention.

The printer server 4, storage system 8, and printer 12 may be implemented in many types of computing environments, such as a network printing environment where the network 16 provides communication between the devices 4, 8, 12. Alternatively, the printer server 4 and storage system 8 may be included in a single desktop machine, such as a personal computer or workstation, that is connected to the printer 12 via a parallel port. Numerous other configurations are also possible.

The printer 12 may be a contone printer or bi-level printer. A contone printer uses a combination of dithering and printing at different levels of intensity to produce different colors and different shades of lightness and darkness. Unlike a true continuous-tone printer, contone printers can dispense toner at only a few different levels of intensity. To produce the full range of colors that can be perceived by the human eye, they must also use dithering techniques.

Preferred embodiments were described with respect to line art and continuous tone graphics. However, the preferred embodiments may be applied to maintaining information on any type of graphics matter, such as text, line art, continuous tone, images, etc.

Preferred embodiments were described with respect to graphics input that comprised pages of a document or book. However, the preferred image file formats 10 may be used to maintain data for any type of graphics input including information on graphics matter, regardless of the format in which the graphics matter is stored, i.e., pages, etc.

Preferred embodiments were described with respect to producing an output file for printing. However, those skilled in the art will appreciate that the preferred embodiments may be used to produce graphics output for any type of output device, including printers, plotters, display monitors, lithography machines, three dimensional modeling machines, etc.

Preferred embodiments discuss storing in the TIFF file either gray scale bit maps, which includes both color and shades of gray, and halftone bit maps. Those skilled in the art will appreciate that the file format of the preferred embodiments may store print image files in any type of file format, such as vector formats, PostScript™**, other bit mapped formats, and any other graphics file format known in the art, e.g., CGM, DXF, EPS, GEM, HPGL, IGES, PIC, PICT, WMF, etc.,

**TIFF and PostScript are trademarks of Adobe Systems Inc.; AIX, OS/2, and RS/6000 are registered trademarks of IBM and OS/390 and INFOPRINT and MVS are trademarks of IBM; WINDOWS is a registered trademark of Microsoft Corporation; UNIX is a registered trademark licensed by the X/Open Company LTD.

Preferred embodiments were described with respect to device independent images represented in a gray scale format and device dependent images represented in a bi-level format. In the preferred embodiments, the device independent formats typically had more possible bit values per pixel than the device dependent format. However, in alternative embodiments, the device dependent format may have the same number or more possible bit values per pixel as the device independent format. Moreover, the device dependent and device independent formats may represent the image in different color spaces. For instance, for color images, the device independent format may be maintained in as a CIE-Lab color space format, and the device dependent format may represent an image in a Cyan-Magenta-Yellow-Black (CMYK) color space that is a transformation of the CIE-Lab device independent image to the CMYK device dependent color space supported by the printer.

In preferred embodiments, the file including the device dependent and device independent data structures providing representations of printed matter on a page are maintained in a single file, e.g., a single TIFF file. In further embodiments, the device dependent and device independent data structures may be maintained in multiple files, wherein the files include information to relate the separate files and device dependent and device independent data structures therein to accomplish the purposes of this invention.

Preferred embodiments were described with respect to a TIFF file used to maintain input for a printer. However, those skilled in the art will appreciate that the preferred embodiment image file format may maintain graphic information for any output device, including any type of printers, display monitor or any other display medium capable of displaying graphical images.

Preferred embodiments for maintaining multiple types of print image file formats in a file were discussed as implemented in the TIFF file format. In further embodiments, the preferred embodiments may be implemented in alternative file formats known in the art to provide both device dependent and device independent print image files in the same file. Preferably, the device independent files are used to store print matter that needs to be transformed for the specific printer in order to print at a high quality, such as continuous tone images, and the device dependent files are used to store print matter that does not need to be transformed for each specific printer to print at a high quality, such as text or line art. One advantage of this file format is that the number of device independent files maintained in the print file, which typically require more space than the device dependent files, is minimized as the print file only includes device independent files for print matter that must be transformed for a specific printer to print at a high quality. Further, device independent files typically require significantly more processing, which degrades printer performance, than device dependent files before they are ready for printing. Thus, the preferred file formats further maximize printer performance by minimizing the processing cycles used to transform print device independent files. Print matter that does not need to be completely transformed in order to print at a high quality on different printers is maintained in device dependent files, which require substantially less transformation processing than device independent files.

In summary, preferred embodiments disclose a system, method, and program for processing graphics input. The graphics input may include a first and second types of graphics matter, such as line art and continuous tone. At least two data structures including representations of the a graphics matter are provided. An object is generated to include information on the data structures, including information relating the data structures. The object is then processed to produce graphics output including the graphics matter in the graphics input.

The foregoing description of the preferred embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A method for processing graphics input, wherein the graphics input includes a first and second types of graphics matter, comprising:

transforming a data structure in a first format representing the graphics input to a transformed data structure in a second format representing the graphics input;

determining the second type of graphics matter in the graphics input;

generating at least one data structure in the first format representing the determined second type of graphics matter;

generating an object to include information on the data structures, including information relating the data structures, wherein the information in the generated object comprises information on the transformed data structure in the second format and each generated data structure in the first format, wherein the information relates each generated data structure with the transformed data structure, and wherein each generated data structure includes representations of a same graphics matter of the second type included in the related transformed data structure; and processing the object to produce graphics output including the graphics matter in the graphics input.

2. The method of claim 1, wherein the first format is a device independent data structure and the second format is a device dependent format.

3. The method of claim 1, wherein the graphics matter of the first type is comprised of line art and the graphics matter of the second type is comprised of continuous tone.

4. The method of claim 1, wherein multiple data structures in the first format representing the graphics input are transformed to multiple data structures in the second format, wherein determining the second type of graphics matter comprises determining instances of the second type of graphic matter in the graphics input, further comprising generating, for each determined instance of the second type of graphic matter, a data structure in the first format representing the instance of the determined second type of graphics matter, wherein generating the information in the object further includes generating information to relate each generated data structure in the first format with one of the transformed data structures in the second format, wherein the related data structures include representations of the same instance of the second type of graphics matter.

5. The method of claim 1, wherein the at least two data structures include representations of the same graphics matter of the second type.

6. The method of claim 1, wherein each generated data structure represents different graphics matter.

7. The method of claim 2, wherein the device independent format represents the graphics matter in one of a first color space and gray scale format and the second format represents the graphics matter in one of a second color space and bi-level format.

8. The method of claim 4, wherein the processing of the object to produce graphics output further comprises:

processing the object information to determine for each transformed data structure in the second format any related generated data structures in the first format, wherein the related data structures include representations of the same instance of the second type of graphics matter;

transforming the determined data structures in the first format to related data structures in the second format; and merging the related data structures in the second format to form graphics output.

9. The method of claim 4, wherein generating the object further comprises generating in the information, for at least one of the transformed data structures in the first format, first pointer information indicating a location in the object of information for another transformed data structure in the first format.

10. The method of claim 9, further comprising generating second pointer information in the information for at least one of the transformed data structures indicating a location in the object of information on one of the generated data structures representing the instance of the second type of graphics matter that is related to the transformed data structure.

11. A system for processing graphics input, wherein the graphics input includes a first and second types of graphics matter, comprising:

a processing unit;

program logic implemented by the processing unit, comprising:

(i) means for transforming a data structure in a first format representing the graphics input to a transformed data structure in a second format representing the graphics input;

(ii) means for determining the second type of graphics matter in the graphics input;

(iii) means for generating at least one data structure in the first format representing the determined second type of graphics matter;

(iv) means for generating an object to include information on the data structures, including information relating the data structures, wherein the information in the generated object comprises information on the transformed data structure in the second format and each generated data structure in the first format, wherein the information relates each generated data structure with the transformed data structure, and wherein each generated data structure includes representations of a same graphics matter of the second type included in the related transformed data structure; and (v) means for processing the object to produce graphics output including the graphics matter in the graphics input.

12. The system of claim 11, wherein the first format is a device independent data structure and the second format is a device dependent format.

13. The system of claim 11, wherein the graphics matter of the first type is comprised of line art and the graphics matter of the second type is comprised of continuous tone.

14. The system of claim 11, wherein the object comprises a TIFF file and wherein the information on the transformed data structure and generated data structure are maintained in image file directories (IFDs).

15. The system of claim 11, wherein the program logic further comprises:

means for transforming multiple data structures in the first format representing the graphics input to multiple data structures in the second format;

means for determining instances of the second type of graphic matter in the graphics input;

means for generating, for each determined instance of the second type of graphic matter, a data structure in the first format representing the instance of the determined second type of graphics matter; and means for generating information in the object to relate each generated data structure in the first format with one of the transformed data structures in the second format, wherein the related data structures include representations of the same instance of the second type of graphics matter.

16. The system of claim 12, wherein the device independent format represents the graphics matter in one of a first color space and gray scale format and the second format represents the graphics matter in one of a second color space and bi-level format.

17. The system of claim 14, wherein the program logic for generating the object further comprises means for generating in the information, for at least one of the transformed data structures in the first format, first pointer information indicating a location in the object of information for another transformed data structure in the first format.

18. The system of claim 17, wherein the program logic further comprises generating second pointer information in the information for at least one of the transformed data structures indicating a location in the object of information on one of the generated data structures representing the instance of the second type of graphics matter that is related to the transformed data structure.

19. The system of claim 18, wherein the object comprises a TIFF file, wherein the information on the transformed data structures in the second format and generated data structures in the first format is implemented in image file directories (IFDs), and wherein the first pointer is maintained in an offset field of the IFD of the transformed data structure.

20. The system of claim 19, wherein the second pointer is maintained in a private tag of the IFD of the transformed data structure, and wherein the IFD including information on the generated data structure addressed by the second pointer includes an offset indicating a location of the IFD for another generated data structure related to the transformed data structure.

21. The system of claim 15, wherein the program logic for processing of the object to produce graphics output further comprises:

means for processing the object information to determine for each transformed data structure in the second format any related generated data structures in the first format, wherein the related data structures include representations of the same instance of the second type of graphics matter;

means for transforming the determined data structures in the first format to related data structures in the second format; and means for merging the related data structures in the second format to form graphics output.

22. An article of manufacture for processing graphics input, wherein the graphics input includes a first and second types of graphics matter, comprising:

transforming a data structure in a first format representing the graphics input to a transformed data structure in a second format representing the graphics input;

determining the second type of graphics matter in the graphics input;

generating at least one data structure in the first format representing the determined second type of graphics matter;

generating an object to include information on the data structures, including information relating the data structures, wherein the information in the generated object comprises information on the transformed data structure in the second format and each generated data structure in the first format, wherein the information relates each generated data structure with the transformed data structure, and wherein each generated data structure includes representations of a same graphics matter of the second type included in the related transformed data structure; and processing the object to produce graphics output including the graphics matter in the graphics input.

23. The article of manufacture of claim 22, wherein the first format is a device independent data structure and the second format is a device dependent format.

24. The method of claim 22, wherein the device independent format represents the graphics matter in one of a first color space and gray scale format and the second format represents the graphics matter in one of a second color space and bi-level format.

25. The article of manufacture of claim 22, wherein the object comprises a TIFF file and wherein the information on the transformed data structure and generated data structure are maintained in image file directories (IFDs).

26. The article of manufacture of claim 22, wherein the graphics matter of the first type is comprised of line art and the graphics matter of the second type is comprised of continuous tone.

27. The article of manufacture of claim 22, wherein multiple data structures in the first format representing the graphics input are transformed to multiple data structures in the second format, wherein determining the second type of graphics matter comprises determining instances of the second type of graphic matter in the graphics input, further comprising generating, for each determined instance of the second type of graphic matter, a data structure in the first format representing the instance of the determined second type of graphics matter, wherein generating the information in the object further includes generating information to relate each generated data structure in the first format with one of the transformed data structures in the second format, wherein the related data structures include representations of the same instance of the second type of graphics matter.

28. The article of manufacture of claim 22, wherein each generated data structure represents different graphics matter.

29. The article of manufacture of claim 26, wherein generating the object further comprises generating in the information, for at least one of the transformed data structures in the first format, first pointer information indicating a location in the object of information for another transformed data structure in the first format.

30. The article of manufacture of claim 29, further comprising generating second pointer information in the information for at least one of the transformed data structures indicating a location in the object of information on one of the generated data structures representing the instance of the second type of graphics matter that is related to the transformed data structure.

31. The article of manufacture of claim 27, wherein the processing of the object to produce graphics output further comprises:

processing the object information to determine for each transformed data structure in the second format any related generated data structures in the first format, wherein the related data structures include representations of the same instance of the second type of graphics matter;

transforming the determined data structures in the first format to related data structures in the second format; and merging the related data structures in the second format to form graphics output.

32. A memory storing an object including information on graphics input, wherein the graphics input includes a first and second types of graphics matter, comprising:

information on a transformed data structure created by transforming a data structure in a first format representing graphics input including the first and second types of graphics matter to a transformed data structure in a second format representing the graphics input;

information on at least one generated data structure in the first format representing the second type of graphics matter in the graphics input;

information relating the data structures, wherein the information relating the data structures comprises information relating each generated data structure with the transformed data structure, wherein each generated data structure includes representations of a same graphics matter of the second type included in the related transformed data structure, and wherein the object is processed to produce graphics output including the graphics matter in the graphics input.

33. The memory device of claim 32, wherein the first format is a device independent format and the second format is a device dependent format.

34. The memory of claim 33, wherein the device independent format represents the graphics matter in one of a first color space and gray scale format and the second format represents the graphics matter in one of a second color space and bi-level format.

35. The memory of claim 32, wherein the object further includes:

information on multiple transformed data structures in the first second format representing the graphics input; and information on multiple data structures in the second format representing instances of the second type of graphic matter in the graphics input;

information to relate each generated data structure in the first format with one of the transformed data structures in the second format, wherein the related data structures include representations of the same instance of the second type of graphics matter.

36. The memory of claim 32, wherein each generated data structure represents different graphics matter.

37. The memory of claim 33, wherein the object comprises a TIFF file and wherein the information on the transformed and generated data structures are maintained in image file directories (IFDs).

38. The memory of claim 35, wherein the object further includes first pointer information in the information for at least one of the transformed data structures in the first format indicating a location in the object of information for another transformed data structure in the first format.

39. The memory of claim 38, wherein the object further comprises second pointer information in the information for at least one of transformed data structures indicating a location in the object of information on one of the generated data structures representing the instance of the second type of graphics matter that is related to the transformed data structure.

40. The memory device of claim 39, wherein the object comprises a TIFF file, wherein the information on the transformed data structures in the second format and generated data structures in the first format is implemented in image file directories (IFDs), and wherein the first pointer is maintained in an offset field of the IFD of the transformed data structure.

41. The memory device of claim system of claim 40, wherein the second pointer is maintained in a private tag of the IFD of the transformed data structure, and wherein the IFD including information on the generated data structure addressed by the second pointer includes an offset indicating a location of the IFD for another generated data structure related to the transformed data structure.

42. A method for processing graphics input, wherein the graphics input is capable of including a first and second types of graphics matter, comprising:

provinding at least two data structures including representations of a same graphics matter wherein at least one of the data structures represent graphics matter in a first format and wherein one data structure represents graphics matter in a second format;

generating an object to include information on the data structures, including information relating the data structures; and processing the object to produce graphics output including the graphics matter in the graphics input.

43. The method of claim 42, wherein each data structure in the second format includes representations of the same graphics matter included in the related data structure in the first format.

44. An article of manufacture for processing graphics input, wherein the graphics input is capable of including a first and second types of graphics matter, the article of manufacture comprising computer usable media including at least one computer program embedded therein that causes the computer to perform:

providing at least two data structures including representations of a same graphics matter, wherein the at least two data structures include representations of the same graphics matter of the second type;

generating an object to include information on the data structures, including information relating the data structures; and processing the object to produce graphics output including the graphics matter in the graphics input.

45. An article of manufacture for processing graphics input, wherein the graphics input is capable of including a first and second types of graphics matter, the article of manufacture comprising computer usable media including at least one computer program embedded therein that causes the computer to perform:

providing at least two data structures including representations of a same graphics matter wherein at least one of the data structures represent graphics matter in a first format and wherein one data structure represents graphics matter in a second format;

generating an object to include information on the data structures, including information relating the data structures; and processing the object to produce graphics output including the graphics matter in the graphics input.

46. The article of manufacture of claim 45, wherein each data structure in the second format includes representations of the same graphics matter included in the related data structure in the first format.

47. A memory storing an object including information on graphics input that is capable of including first and second types of graphics matter, comprising:

information on at least two data structures including representations of a same graphics matter, wherein the at least two data structures include representations of the same graphics matter of the second type; and information relating the data structures.

48. A memory storing an object including information on graphics input that is capable of including first and second types of graphics matter, comprising:

information on at least two data structures including representations of a same graphics matter, wherein at least one of the data structures represent graphics matter in a first format and wherein one data structure represents graphics matter in a second format; and information relating the data structures.

49. The memory of claim 48, wherein each data structure in the second format includes representations of the same graphics matter included in the related data structure in the first format.

* * * * *